US007832367B2

(12) United States Patent
Valentas et al.

(10) Patent No.: US 7,832,367 B2
(45) Date of Patent: Nov. 16, 2010

(54) FURNACE PANEL LEAK DETECTION SYSTEM

(75) Inventors: Louis Scott Valentas, Cranberry Township, PA (US); Eric Paul Tierney, Crescent, PA (US)

(73) Assignee: Berry Metal Company, Harmony, PA (US)

( * ) Notice: Subject to any disclaimer, the term of this patent is extended or adjusted under 35 U.S.C. 154(b) by 481 days.

(21) Appl. No.: 11/999,464

(22) Filed: Dec. 5, 2007

(65) Prior Publication Data

US 2009/0148800 A1     Jun. 11, 2009

(51) Int. Cl.
*G01M 3/04* (2006.01)
(52) U.S. Cl. .................. 122/506; 122/6 A; 122/6 C; 73/40; 373/76
(58) Field of Classification Search ................ 122/6 A, 122/6 B, 6 C, 504.3, 506, 494, 499; 73/40, 73/40.5 R; 373/75, 76
See application file for complete search history.

(56) References Cited

U.S. PATENT DOCUMENTS

| | | | | |
|---|---|---|---|---|
| 2,345,188 A * | 3/1944 | Foell | ........................... | 122/6 B |
| 3,314,668 A * | 4/1967 | Rosenak | ..................... | 266/190 |
| 4,133,373 A * | 1/1979 | Slagley et al. | .............. | 165/11.1 |
| 4,207,060 A | 6/1980 | Zangs | | |
| 4,304,396 A * | 12/1981 | Udoh | ......................... | 266/193 |
| 4,455,017 A * | 6/1984 | Wunsche | ..................... | 266/190 |
| 4,462,319 A | 7/1984 | Larsen | | |
| 4,787,605 A * | 11/1988 | Kaptein | ....................... | 266/194 |
| 4,813,055 A | 3/1989 | Heggart | | |
| 4,903,640 A * | 2/1990 | Howard | ....................... | 122/6 A |
| 5,883,815 A * | 3/1999 | Drakulich et al. | ............. | 702/51 |
| 6,031,861 A * | 2/2000 | Koster | .......................... | 373/72 |
| 6,059,028 A * | 5/2000 | Kincheloe et al. | ........... | 165/297 |
| 6,237,408 B1 | 5/2001 | McCormick | | |
| 6,404,799 B1 * | 6/2002 | Mori et al. | ..................... | 373/71 |
| 6,457,483 B1 | 10/2002 | Uhrig | | |
| 6,804,990 B2 * | 10/2004 | Weber | ........................... | 73/40 |
| 2006/0272830 A1 | 12/2006 | Fima | | |

* cited by examiner

*Primary Examiner*—Gregory A Wilson
(74) *Attorney, Agent, or Firm*—John F. Letchford; Archer & Greiner, P.C.

(57) ABSTRACT

A furnace panel leak monitoring and control system for fluid-cooled panels in high temperature industrial furnaces such as, for example, smelting furnaces, blast furnaces and electric arc furnaces. The system performs at least two and up to four functions simultaneously. At minimum, the system includes one or more temperature sensors received within the body of the panel to monitor temperature within the metal of the panel itself, and pressure sensors installed proximate the inlet and outlet of each panel coolant fluid circuit, which circuits are preferably periodically automatically tested, to check for leaks in the coolant circuits. In addition, the system preferably includes temperature and flow sensors for monitoring the furnace panel coolant circuit(s) for temperature and flow fluctuations, respectively, which may be indicative of leaking cooling circuits. The system triggers visual and/or audible alarms to alert a human operator of an apparent coolant fluid leak situation.

9 Claims, 5 Drawing Sheets

FURNACE PANEL LEAK DETECTION SYSTEM

FIELD OF THE INVENTION

The present invention relates in general to furnace apparatus and in particular to a system including method and apparatus for detecting leaks in fluid-cooled panels and coolers for industrial furnaces such as metal smelting furnaces, blast furnaces, electric arc furnaces (EAFs) or the like.

BACKGROUND OF THE INVENTION

Many industrial furnaces such as smelting furnaces, blast furnaces, EAFs and the like typically have shells comprised of fluid-cooled metallic panels. The panels are cooled by conduits or channels extending through the panels that are connected to cooling circuits through which cooling fluid (typically water) is pumped and recirculated. Each panel has an inlet for the cooling fluid connected to the upstream end of the cooling circuit and an outlet for the cooling liquid connected to the downstream end of the cooling circuit.

Because of the high temperature and severe reaction conditions inside many industrial furnaces, furnace wall panels frequently develop leaks. However, isolating the leak to the particular cooling circuit in which the leak is located may be a cumbersome procedure when the cooling system contains several cooling circuits, as is often the case in modern industrial furnaces.

It is important to rapidly detect such leaks. Failure to do so may cause large volumes of cooling water to enter into the furnace. Water that becomes trapped under the molten metal quickly turns to steam resulting in a rapid expansion and subsequent explosion. These catastrophic events, though rare, can cause massive amounts of damage to the furnace and its surroundings. Alternatively, when the water in the leaky cooling member is at a pressure lower than the furnace internal gas pressure, failure to rapidly detect a leak may cause the loss of large amounts of furnace gas, often combustible gas, into the cooling circuit which may create serious safety problems. In addition, furnace gas entering the cooling system could be drawn into the pumping system and damage the pumps. Moreover, furnace gas leaking into, or steam generated in, a cooling plate that has or is about to fail may generate chain reaction damage in downstream cooling members in the circuit. That is, the temperature of the cooling fluid in downstream cooling members rises, thereby compromising the effectiveness of the cooling fluid in downstream cooling members which, in turn, may potentially cause a leak in one or more of those downstream members.

In certain prior art leak detection devices systems, one or more thermocouples are installed into the metal of the panels themselves. In the event the thermocouples detect a sudden change in panel metal temperature indicative of overheating, leak or rupture, an alarm is activated. The failure or simple delay in operation of a such a single-tier monitoring system may result in a water leak with potential attendant equipment damage and possible personal injury. As used herein, a "single-tier" monitoring system is a furnace panel leak detection system involving only one means or mechanism by which a coolant fluid leak may be detected. An example of a thermocouple-controlled industrial furnace roof panel is described in U.S. Pat. No. 4,813,055.

Another single-tier system is described in U.S. Pat. No. 4,455,017 wherein a thermostatically-controlled valve monitors panel temperature to control water flow through the panel by detecting the water temperature in the panel.

Another common single-tier leak detection system involves the use of water flow sensors for detecting changes in water flow in the panel which may be indicative of panel failure. Numerous types of flow sensors and associated instrumentation have been developed for measuring fluid flow. These sensors may include orifice meters, turbine meters, vortex meters, magnetic flow meters, and the like. One of these devices may be placed on the supply line of the cooling circuit and another one of may be placed on the return line of that circuit. The flow sensors detect differences in flow rates to determine if there is any leakage in the circuit between the inlet and outlet flowmeters. An example of such a system is described in U.S. Pat. No. 6,804,990.

U.S. Pat. No. 4,207,060 describes multiple-tier furnace wall panel leak detection system, although the system does not include thermocouples installed in the wall panels themselves for directly detecting the panel metal temperature. The system includes a cooling water supply line and a cooling water discharge line for recirculating cooling water through the furnace panels. The cooling water supply line includes a single water temperature sensor, a single water pressure sensor and a single water flow sensor. Following these sensors a check valve introduces the cooling water into each panel. Coolant water exiting each panel passes water temperature and pressure sensors, and thereafter a pressure relief valve, before passing through a check valve and into the cooling water return line. The system includes an alarm system and furnace shut down capability in the event a problem is detected in water temperature, pressure or flow. While an improvement over the single-tier furnace panel leak detection systems described above, the multiple-tier system disclosed in U.S. Pat. No. 4,207,060 nevertheless suffers from certain disadvantages.

For example, by their very nature, check valves present obstructions in the fluid line which cause sudden spike-like pressure drops in the fluid circuit when the check valve opening pressure is overcome. As seen in FIG. 3 of U.S. Pat. No. 4,207,060, the furnace panels include panels of different sizes that inherently produce different pressure drops at the inlets of each panel due to the different coolant volumes of the panels when the check valve trigger pressure is reached. Together, these variables at least temporarily affect the reliability of the data recorded by and observed from the panel outlet temperature and flow sensors. Moreover, the default "off" position of check valves tends to promote the buildup of foreign solid particles which could ultimately block the fluid circuit. Should clogging or mechanical failure occur in either the panel inlet or outlet check valve, water flow through the panel will be reduced or stopped, thereby leading to a rapid rise in panel temperature and possible harm to the panel, the furnace and the furnace surroundings. In addition, the provision of the coolant flow check valves at the outlets of the panels can cause water hammer damage to the coolant water return line into which they are discharged because of the sudden actuation nature typical of check valves.

Additionally, the presence of a single water temperature sensor, a single water pressure sensor and a single water flow sensor in the cooling water supply line upstream of the panels, i.e., before the coolant water reaches any of the panels, cannot provide an operator of the furnace with optimally accurate readings of the coolant water temperature, pressure and flow rate as it enters each panel. This is especially true of the panels most distant from the cooling water supply line sensors. The significance of this feature is that the downstream temperature and flow sensors compare panel water temperature versus coolant water temperatures and flows that may be rather distant therefrom, hence producing less than desirable comparative results.

Still further, the pressure relief valves at the outlets of the panels provide no meaningful data or information about conditions within the panels. Pressure relief valves are passive devices. They simply release pressurized coolant vapor or steam when a predetermined pressure has been reached. In this way, they are analogous to a check valve for fluid flow in that they suddenly function at a predetermined threshold level but are otherwise inoperative. As such, they are prone to clogging. Furthermore, they do not provide the furnace operator with real-time coolant panel outlet pressure data that may be useful in understanding and possibly anticipating malfunctions that might occur in a furnace panel during operation.

Lastly, the furnace wall panels of U.S. Pat. No. 4,207,060 consist of an elaborate array of serpentine pipes that are welded together and directly exposed to the intense heat of the interior of the furnace. Welds are notorious locations for cracks that may lead to water leakage. Additionally, despite the possibility that the surfaces of the pipes facing the interior of the furnace may become coated with slag during furnace operation and therefore afforded some level of thermal insulation, the substantial internal volume of the pipes—which constitutes the majority of the volume of the panels—requires that high quantities of coolant water be pumped through the pipes to maintain the panels at a desired temperature. This presents a problem at plant locations where coolant water is in limited supply and/or available at premium cost.

It is also known in the art to periodically manually check the pressure of coolant delivered to and from a furnace panel. However, manual monitoring is undesirable because of its inherent dependence upon the diligence and competence of a human operator coupled with the reliability of the equipment used to make the pressure measurements.

An advantage exists, therefore, for a furnace panel leak detection system that includes several tiers of coolant panel leak detection mechanisms, each of which actively and continuously monitor and report either the condition of the panel itself or the coolant that flows therethrough.

A further advantage exists for a system for periodically checking the water flow pressure through a furnace panel in order to identify potential coolant problems before they evolve into potentially dangerous situations. A preferred leak detection system will also allow for all panels to be thoroughly tested and checked for leaks and for water flow prior to turning on or starting the furnace as a sort of a pre-systems check.

SUMMARY OF THE INVENTION

The present invention provides a furnace panel leak detection system that includes several types of redundant coolant panel leak detection mechanisms which continuously and actively monitor and report the condition of the panel itself or the coolant fluid that flows therethrough. In this way, several layers or tiers of protective redundancy are built into the system that serve to provide instantaneous information about the furnace panel that may be necessary for quick shut down of the coolant system flow or furnace operation.

More particularly, the present invention relates to a furnace panel leak monitoring and control system for fluid-cooled panels in high temperature industrial furnaces such as, for example, smelting furnaces, blast furnaces and EAFs. The system performs at least two and up four monitoring functions simultaneously. At minimum, the system includes one or more temperature sensors or thermocouples received within the body of the panel to monitor temperature within the metal of the panel itself, and pressure sensors installed proximate the inlet and outlet of each panel coolant fluid conduit, which conduits are preferably periodically automatically tested to check for leaks. In addition, the system preferably includes temperature and flow sensors for monitoring the furnace panel coolant circuit(s) for temperature and flow fluctuations, respectively, which may be indicative of leaking cooling circuits. Signals from any of the aforementioned sensors are continuously transmitted to a monitoring unit for observation by a human operator via a computer monitor or the like. In the event of what appears to be a panel leak situation, the system triggers visual and/or audible alarm means to alert the human operator of the situation.

The system further desirably allows local or remote monitoring, diagnosis and troubleshooting of potential problems with furnace panels that exhibit abnormal performance characteristics.

Preferably, the furnace panels according to the invention have at least two independent coolant fluid conduits that are isolated from fluid communication from one another. Under normal operating conditions all of the conduits will be open to coolant flow therethrough for optimum cooling of the panel. However, periodically (and preferably automatically), one of the conduits is closed to fluid flow and pressure tested for leakage while the other conduit(s) remain open to fluid flow. According to the invention, each of the conduit(s) that are not presently undergoing pressure testing have sufficient flow capacity to adequately cool the panel during testing of the closed conduit or in the event a conduit must remain closed for some extended period of time before scheduled maintenance or replacement of the panel is to be performed.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
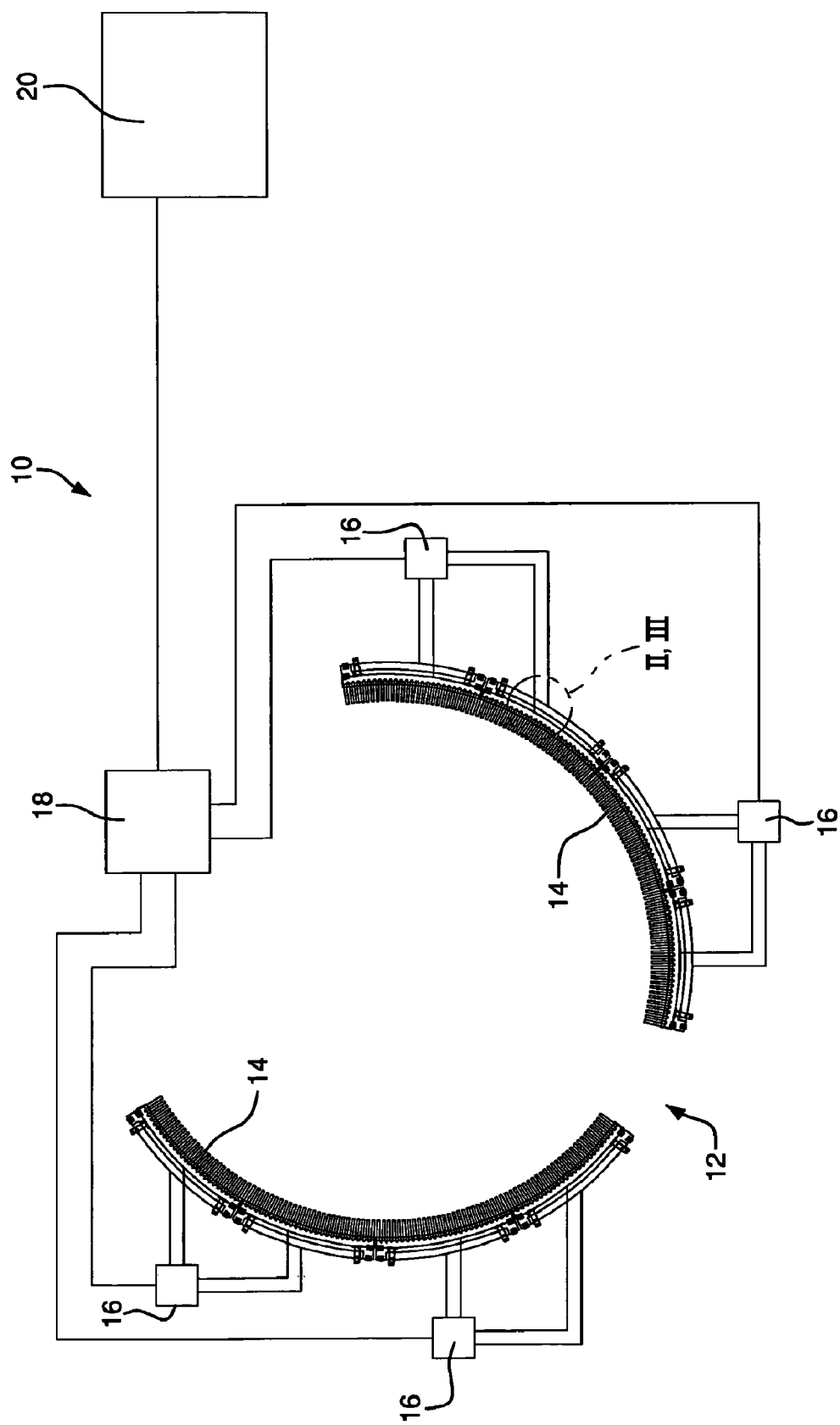
FIG. 1 is a schematic view of a furnace panel fluid coolant leak detection system according to the present invention.

Referring to the drawings wherein like or similar references indicate like or similar elements throughout the several views, there is shown in FIG. 1 a furnace panel fluid coolant leak detection system according to the present invention, identified generally by reference numeral 10. The system includes a high energy, typically industrial, furnace 12 such as a metal smelting furnace, a blast furnace, an EAF or the like. Furnace 12 is shown in top plan view in FIG. 1 and includes a plurality of fluid-cooled wall panels 14, described in greater detail hereinafter, several of which are omitted for clarity of illustration. A typical furnace may be about 15-30 feet in diameter and may comprise from as few as about 4 panels to as many as about 40 panels, although the furnace dimensions and number of panels may vary and will be dependent upon the requirements of the furnace installation.

System 10 further comprises a plurality of electrical junction boxes 16 in electrical communication with a plurality of sensors that continuously monitor and provide feedback regarding physical conditions of the panels 14 and the coolant fluid flowing therethrough. Preferably, a single junction box 16 simultaneously monitors the sensors associated with two or more panels 14. Further, junction boxes 16 operate coolant fluid circuit valves (described below) that control fluid flow through the panels. The panel sensor signals received by junction boxes 16 are preferably transmitted to a main junction box 18 from which the sensor data is transmitted through either a wired or wireless connection to a monitoring unit 20. Conversely, panel valve control signals are transmitted from the monitoring unit 20 to the main junction box 18 to the appropriate junction box(es) 16 and thereafter to the appropriate panel fluid control valves.

By way of example, monitoring unit 20 may be an on-site station or pulpit which includes a suitable computer, e.g., PC, laptop, or the like, equipped with a monitor and display screen whereby a human operator may observe the conditions sensed by the panel sensors of each panel 14 and enter panel valve control commands if and when necessary. Alternatively, monitoring unit 20 may be an off-site device such as any suitable presently known or hereinafter developed PC, laptop computer, personal digital assistant or the like that can wirelessly monitor signals transmitted by the main junction box 18. Whether located on-site or off-site, monitoring unit 20 is desirably capable of interacting with the main junction box 18 in such a way as to enable rapid local or remote monitoring, diagnosis and troubleshooting of potential problems with furnace panels that exhibit abnormal performance characteristics. Additionally, the monitoring unit preferably includes audible and/or visual alarm means for alerting a human operator of a potential or actual panel coolant leak or other harmful condition. Further, the software and hardware of system 10 may be architected for manual and/or automatic panel valve fluid control in the event a danger condition is sensed.

Figure 2:
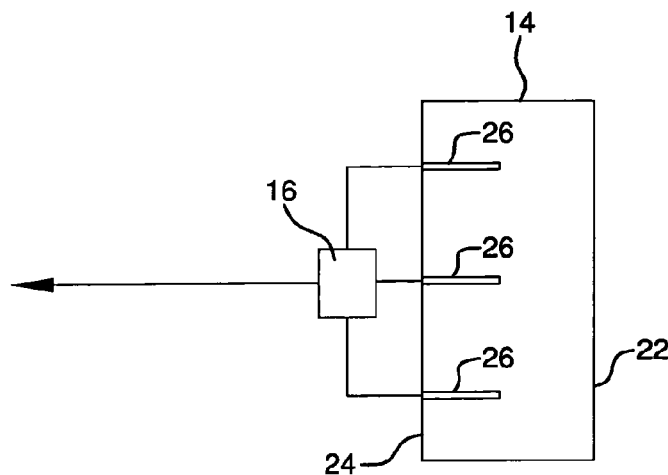
FIG. 2 is an enlarged view of the encircled portion II, III of FIG. 1 depicting a schematic view of a furnace panel thermocouple connection.

Referring to FIG. 2 there is shown an enlarged view of the encircled portion II, III of FIG. 1, in particular, a schematic view of a furnace panel thermocouple connection. FIG. 2 shows a top view of panel 14, wherein reference numeral 22 represents the front wall of the panel which faces the interior of a furnace and reference numeral 24 represents the rear wall of the panel which faces the exterior of a furnace. According to the invention, at least one thermocouple or similar temperature sensor 26 is received in the rear wall 24. Preferably, panel 14 includes a plurality of such temperature sensors. Pursuant to a presently preferred, but non-limiting, embodiment, panel 14 carries three temperature sensors 26 generally equally spaced along the length of the panel (as is also shown in FIGS. 4B, 4C, 4E, 5A, 5B and 5D).

Temperature sensors 26 are electrically connected by suitable connectors 28 (FIGS. 4B, 4D, 5A, 5B and 5C) that preferably transmit digital electric signals to a junction box 16 (FIG. 3) which, as noted above, transmits sensed data to the main junction box. The purpose of temperature sensor(s) 26 is to detect wear or thinning (melting) at the working face or front wall 22 of the panel. Generally, panel wear is a gradual phenomenon that occurs throughout the service life of the panel. Consequently, temperature sensor(s) 26 provide a sort of early warning system for notifying an operator of potential future problems. If, however, one or more of the sensors 26 shows a sudden temperature spike, it will send a representative alarm signal which ultimately reaches the monitoring unit. At that moment, the monitoring unit will visually and/or audibly alert the operator of the excessive temperature condition of a specific panel and the heat supplied to the furnace will be reduced or possibly shut off. Sensors 26 thus constitute a first tier of the multiple-tiered and redundant furnace panel leak detection system according to the present invention.

Figure 3:
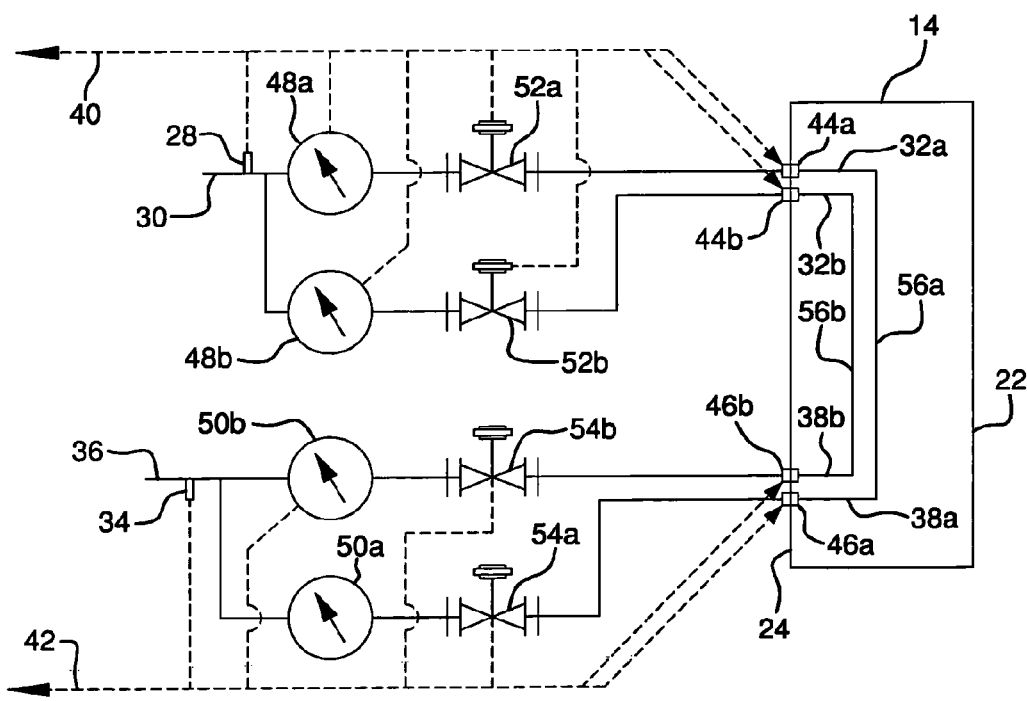
FIG. 3 is an enlarged view of the encircled portion II, III of FIG. 1 depicting a schematic view of furnace panel fluid temperature, pressure and flow sensor connections.

Referring to FIG. 3 there is shown an enlarged view of the encircled portion II, III of FIG. 1, in particular, a schematic view of furnace panel fluid temperature, pressure and flow sensor connections. FIG. 3 shows a top view of panel 14, wherein reference numeral 22 again represents the front wall of the panel which faces the interior of a furnace and reference numeral 24 again represents the rear wall of the panel which faces the exterior of a furnace. According to the invention, a thermocouple or similar temperature sensor 28 is in communication with each furnace panel coolant panel supply line 30 proximate furnace panel coolant conduit inlets 32a and 32b (discussed below) and another thermocouple or similar temperature sensor 34 is in communication with each furnace panel coolant panel return line 36 proximate furnace panel coolant conduit outlets 38a and 38b (also discussed below). As will be appreciated, temperature sensors 28 and 34 continuously monitor the temperature of coolant entering and leaving panel 14 and those signals are continuously transmitted, as indicated by dashed schematic arrows 40 and 42, respectively, through the junction boxes to the monitoring unit (neither of which are shown in FIG. 3). In the event a substantial temperature difference is suddenly detected between the coolant panel water supply and return lines by sensors 28 and 34, the system software indicates an alarm condition at the monitoring unit. Depending on the software and hardware architecture of the system, the alarm condition sensed by temperature sensors 28 and 34 may either cause automatic closure of or permit a human operator to manually close coolant fluid inlet valves 44a and 44b and/or coolant fluid outlet valves 46a and 46b, the structure and function of which is described in greater detail below.

According to a presently preferred embodiment of the invention, a plurality of pressure gauges or sensors 48a and 48b are in communication with each furnace panel coolant panel supply line 30 proximate furnace panel coolant conduit inlets 32a and 32b and a plurality of pressure sensors or gauges 50a and 50b are in communication with each furnace panel coolant panel return line 36 proximate furnace panel coolant conduit outlets 38a and 38b. Pressure sensors 48a, 48b, 50a and 50b continuously monitor the pressure of coolant entering and leaving panel 14 and those signals are continuously transmitted, as indicated by dashed schematic arrows 40 and 42, respectively, through the junction boxes to the monitoring unit. In the event a substantial pressure difference is suddenly detected between the coolant panel water supply and return lines by sensors 48a, 48b, 50a and 50b, the system software indicates an alarm condition at the monitoring unit. Again, depending on the software and hardware architecture of the system, the alarm condition sensed by sensors 48a, 48b, 50a and 50b, may cause either automatic closure of or permit a human operator to manually close coolant fluid inlet valves 44a and 44b and/or coolant fluid outlet valves 46a and 46b.

According to a presently preferred embodiment of the invention, a plurality of flow meters or sensors 52a and 52b are in communication with each furnace panel coolant panel supply line 30 proximate furnace panel coolant conduit inlets 32a and 32b and a plurality of flow meters or sensors 54a and 54b in communication with in each furnace panel coolant panel return line 36 proximate furnace panel coolant conduit outlets 38a and 38b. Flow sensors 52a, 52b, 54a and 54b continuously monitor the flow of coolant entering and leaving panel 14 and those signals are continuously transmitted, as indicated by dashed schematic arrows 40 and 42, respectively, through the junction boxes to the monitoring unit. In the event a substantial flow difference is suddenly detected between the coolant panel water supply and return lines by sensors 52a, 52b, 54a and 54b, the system software indicates an alarm condition at the monitoring unit. Again, depending on the software and hardware architecture of the system, the alarm condition sensed by sensors 52a, 52b, 54a and 54b, may either cause automatic closure of or permit a human operator to manually close coolant fluid inlet valves 44a and 44b and/or coolant fluid outlet valves 46a and 46b.

FIG. 3 schematically represents a presently preferred of the instant invention in which the coolant fluid supply and return lines 30 and 36 are each equipped with all three sets of the aforesaid temperature, pressure and flow sensors. It will be understood, however, that the furnace panel leak detection system of the invention may include just one set of the temperature, pressure and flow sensors or any combination of two sets thereof.

Still referring to FIG. 3, the furnace panel leak detection system according to the invention desirably comprises furnace panels 14 that include a plurality of internal coolant fluid flow conduits each of which are isolated from fluid communication from one another. As seen in FIG. 3, the plurality of conduits are represented by reference numerals 56a and 56b. FIG. 3 and subsequent drawing figures depict a furnace panel containing two such conduits. However, it will be understood that the present invention is not limited to a furnace panel including only two separate coolant conduits but may encompass panels possessing three or more discrete conduits. It will be likewise understood that each coolant flow conduit present in panel 14 will be in fluid communication with coolant fluid supply and return lines equipped with any one or more sets of the aforementioned temperature, pressure and flow sensors.

Preferably, furnace panels 14 according to the invention have at least two independent coolant fluid conduits that are isolated from fluid communication from one another. Under normal operating conditions all of the conduits will be open to coolant flow therethrough for optimum cooling of the panels. However, periodically (and preferably automatically), one of the conduits is closed to fluid flow and pressure tested for leakage while the other conduit(s) remain open to fluid flow, whereby furnace operation is uninterrupted during pressure testing. The conduit(s) that are not presently undergoing pressure testing will be designed to have sufficient flow capacity to adequately cool the panel during testing of the closed conduit or in the event a conduit must remain closed for some extended period of time before maintenance or replacement of the panel is to be performed. Since industrial furnaces may be subject to different spatial and performance considerations, the design specifications of individual conduits having sufficient flow capacity to adequately cool the panel during testing of the closed conduit may vary. The parameters and formulae for determining adequate conduit flow capacity are known to those skilled in the present art and do not form an essential part of the present invention.

The method for testing the various independent furnace panel coolant fluid conduits is generally as follows: (1) closing one of the plurality of panel conduits to fluid flow, (2) testing the closed conduit for fluid leakage, and (3) opening the closed conduit. The method is then repeated for each of the other panel conduits. If leakage is discovered in any of the conduits, the appropriate inlet and outlet valves in communication therewith are closed to block fluid flow through the compromised conduit.

More specifically, in reference to FIG. 3, valves 44a, 44b, 46a and 46b are preferably accurate, electronically-controlled, motor-operated valves, such as a knife/gate valves, ball valves or the like. Unlike check valves, valves of this sort assume either "on" or "off" positions and thus effectively cut off all potential coolant water flow when in the "off" position. In contrast, check valves merely impede water flow in one direction. Ball valves are generally preferred because of their favorable combination of low cost, low leakage rates and low pressure drop. Preferably the valve motors have fixed or variable valve element opening and closure rates of between about two to five seconds in order to minimize the likelihood of water hammer that might rupture or otherwise damage coolant fluid supply and return lines 30 and 36.

Taking panel conduit 56a as a starting point in a pressure testing procedure, coolant fluid outlet valve 46a is first closed, followed thereafter by coolant fluid outlet valve 44a, thereby creating a closed circuit for precise testing across conduit 56a of a selected panel 14. With conduit 56a properly isolated, pressure sensor 50a is electronically monitored to determine whether the pressure in conduit 56a is within predetermined specifications. If the detected pressure drops beyond a predetermined level, it indicates a leak in the conduit. In such case, a signal will be sent back to the monitoring unit and an alarm will activate. The circuit incorporating conduit 56a will then be automatically shut off hence eliminating the possibility of any water entering the furnace. If it is determined the system is working properly with regard to conduit 56a, the water inlet and outlet valves 44a and 46a will be reopened and the second conduit 56b (and any additional conduits) will be similarly and sequentially tested.

Monitoring preferably takes place at predetermined intervals (e.g., every 15 to 30 minutes). This enables the monitoring and testing of the panels to be performed while the furnace remains in uninterrupted service. Preferably all testing data will be stored and archived for future reference. The testing data can be monitored on-site or independently from an off-site location, thereby minimizing response time for problem solving, if necessary.

A particular advantage of the instant plural conduit or plural circuit design is that if one fluid conduit or circuit is compromised, the other circuit can continue to cool the panel until the next scheduled furnace outage. In contrast, if a failure occurs in the single circuit or single conduit furnace panels presently known in the art, the panel must be immediately shut off and replaced thereby necessitating immediate shut down of the furnace, which is a far less desirable and inefficient manner of furnace operation.

FIGS. 4A-4E and 5A-5D reveal alternative embodiments of fluid-cooled furnace panels constructed in accordance with the present invention. The furnace panel is identified generally by reference numeral 14' in FIGS. 4A-4E and by reference numeral 14" in FIGS. 5A-5D. FIGS. 4A-4E and 5A-5D variously include several other previously discussed structural features, such as thermocouples 26, electrical connectors 28, furnace panel coolant conduit inlets 32a and 32b and furnace panel coolant conduit outlets 38a and 38b as they might appear in a typical panel construction. Panels 14' and 14" are preferably comprised of a solid metallic body cast around a plurality of internal metal fluid conduits, such as conduits 56a and 56b of FIG. 3, that are isolated from communication with on another in the manner described above. The conduits, which typically may range from about 1-1.5 inches in diameter, may be formed of any durable and thermally conductive metal or metal alloy. A presently preferred construction is copper/nickel alloy pipe. Similarly, panels 14' and 14" may be fabricated from any durable and thermally conductive metal or metal alloy. However, a presently preferred material is primarily formed from cast copper because of its high thermal conductivity and demonstrated durability in high energy industrial furnace applications.

Figure 4A:
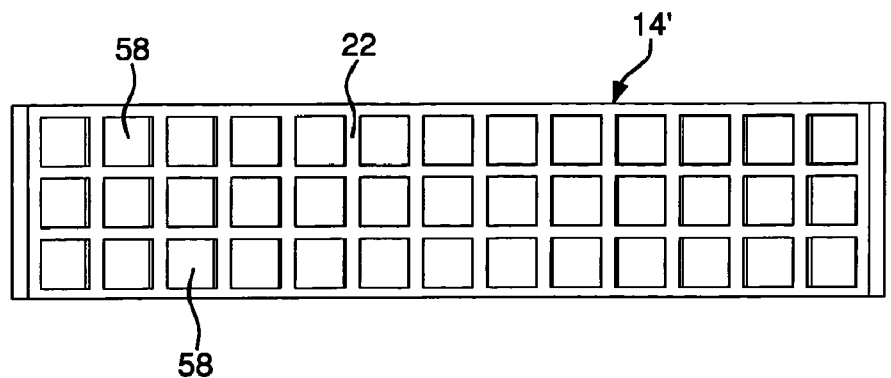
FIGS. 4A-4E are front, top, rear, side and rear perspective views, respectively, of a first embodiment of a furnace panel suitable for use in the furnace panel fluid coolant leak detection system according to the present invention.
Figure 4B:
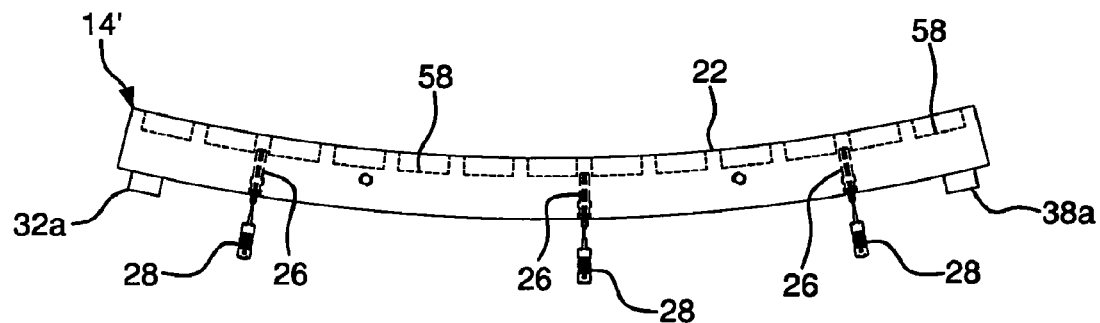
Figure 4C:
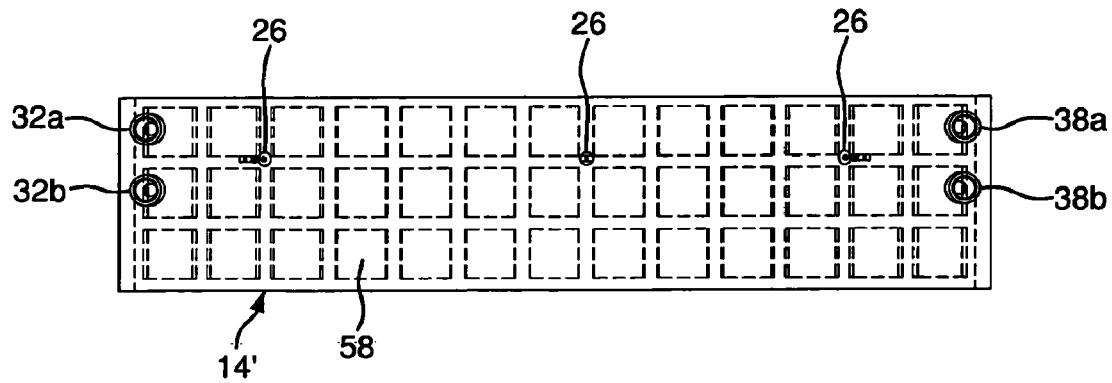
Figure 4D:
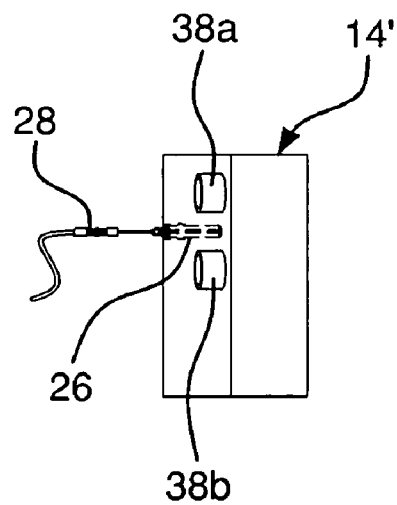
Figure 4E:
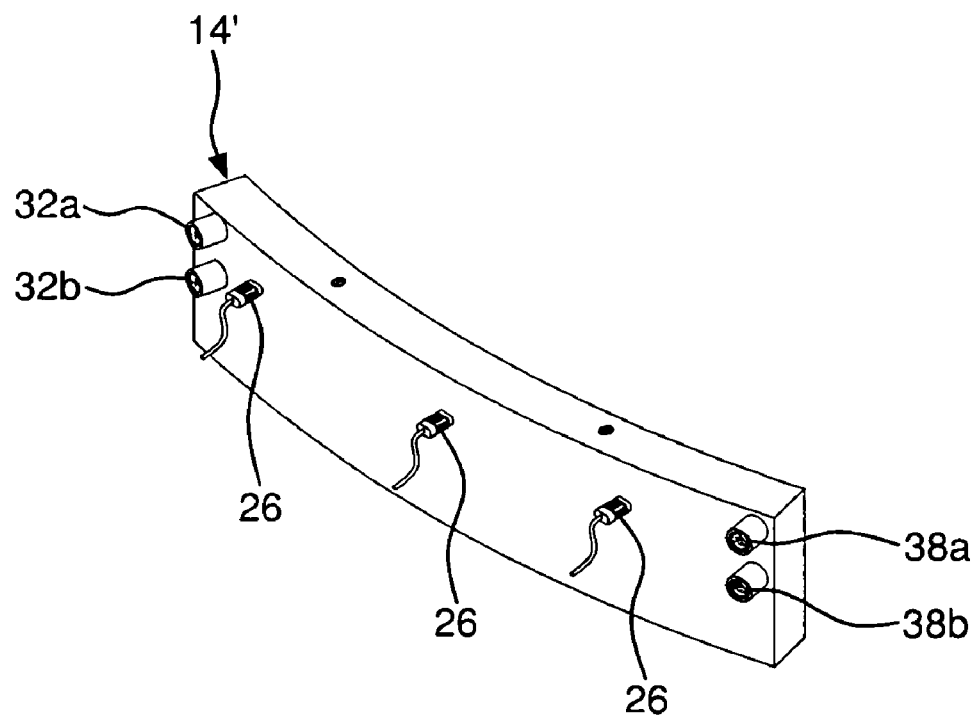
Figure 5A:
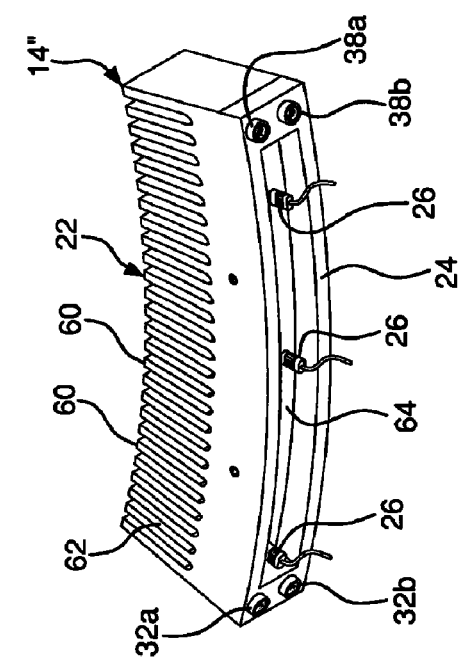
FIGS. 5A-5D are top, rear, side and rear perspective views, respectively, of a further embodiment of a furnace panel suitable for use in the furnace panel fluid coolant leak detection system according to the present invention.
Figure 5C:
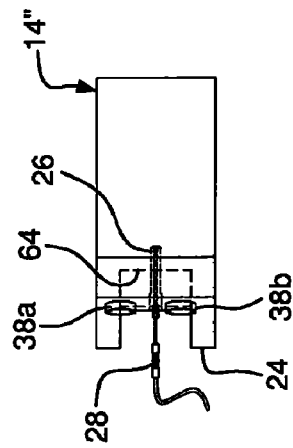
Figure 5B:
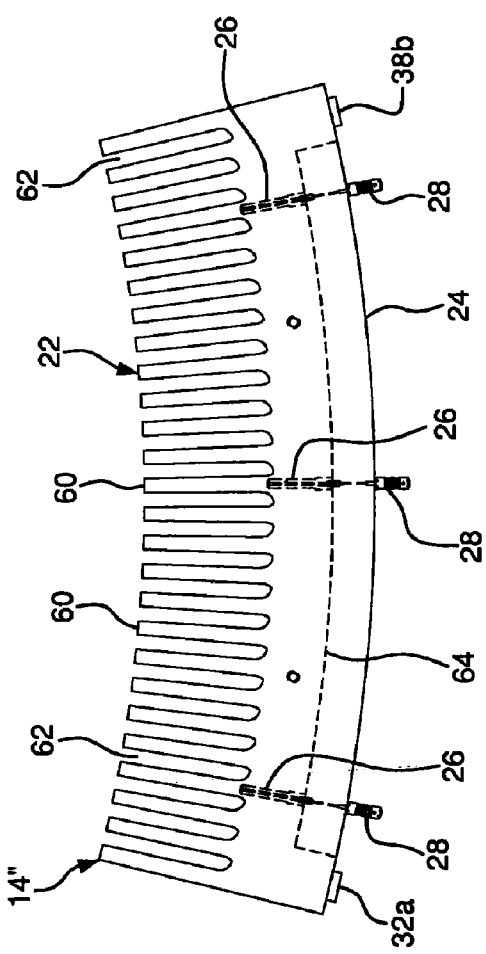
Figure 5D:
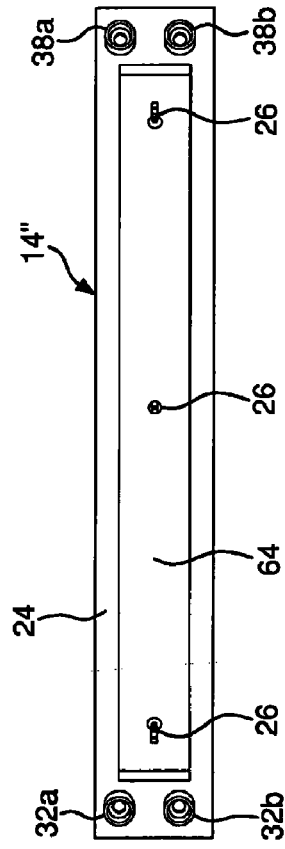

Referring more specifically to FIGS. 4A-4C, the front wall or working face 22 of panel 14' is formed to define a grid or waffle-like pattern including a plurality of slag retention depressions or pockets 58. The slag retention pockets are cast in working face 22 to hold furnace slag and reduce heat loading on to the panel. This helps to create a uniform heat load and extends the life of the panel. It is believed that these panels can last for several years or up to 100,000 furnace heats. Accordingly, they can be expected to last on average 3 to 4 times longer than a tubular steel pipe panel such as that shown, for example, in U.S. Pat. No. 4,207,060. Panel 14' is normally designed to be mounted vertically in a furnace and may be used in new furnace constructions or to replace existing single fluid circuit panels. The dimensions of panel 14' can be of almost any size and shape.

Referring to FIGS. 5A-5D, it is seen that the front wall or working face 22 of panel 14" is defined by a plurality of fins or vanes 60 spaced apart by gaps or troughs 62. In addition, the rear wall 24 includes a recess 64. Panel 14" is designed to be placed on or into a furnace's refractory brick. This panel is generally not intended to replace existing furnace panels. The fins 60 are positioned below a standard panel in the slag layer. Panel 14" provides cooling and protection to the refractory brick, thereby extending the life of the brick. The panel is typically between about 10 to 16 inches in height and the thickness ranges between about 6 to 12 inches in thickness. Its length typically may range from about 3 to about 10 feet.

In each of panels 14' and 14", the water cooling provided by the internal conduits is about one inch from the hot or working face of the panels (i.e., the bottom of pockets 58 of panel 14' or the bottom of troughs 62 of panel 14") thus providing effective cooling of the hot face. In addition, neither panel 14' nor panel 14" contain any external welds, which are potential sources of structural weakness and therefore susceptible to cracks and coolant leaks. This is in stark contrast to the many welds that are necessary to fabricate the serpentine tubular panel of U.S. Pat. No. 4,207,060.

The instant system is thus a durable, leak-resistant, multiple-tiered furnace panel leak detection system which provides a fail-safe system that simultaneously monitors panel temperature and one or more of coolant water temperature, flow and pressure to give continuous and comprehensive leak detection surveillance.

Although the invention has been described in detail for the purpose of illustration, it is to be understood that such detail is solely for that purpose and that variations can be made therein by those skilled in the art without departing from the spirit and scope of the invention as claimed herein.

What is claimed is:

1. A furnace panel leak detection system comprising:
a metallic panel;
at least one thermocouple received in said panel;
at least one coolant fluid conduit in said panel including a coolant fluid inlet and a coolant fluid outlet;
a coolant fluid supply line in communication with said inlet and a coolant fluid return line in communication with said outlet; and
a pair of pressure sensors for continuously transmitting pressure data signals to a monitoring unit, wherein one of said pair of pressure sensors is in communication with said coolant fluid supply line and the other of said pair of pressure sensors is in communication with said coolant fluid return line.

2. A furnace panel leak detection system comprising:
a metallic panel;
at least one thermocouple received in said panel;
at least one coolant fluid conduit in said panel including a coolant fluid inlet and a coolant fluid outlet;
a coolant fluid supply line in communication with said inlet and a coolant fluid return line in communication with said outlet; and
at least one pair of: (1) temperature sensors for continuously transmitting temperature data signals to a monitoring unit, (2) pressure sensors for continuously transmitting pressure data signals to a monitoring unit, and (3) flow sensors for continuously transmitting flow data signals to a monitoring unit, wherein one of each of said at least one pair of temperature, pressure and flow sensors is in communication with said coolant fluid supply line and the other of said at least one pair of temperature, pressure and flow sensors is in communication with said coolant fluid return line.

3. A furnace panel leak detection system comprising:
a metallic panel;
at least one thermocouple received in said panel;
a plurality of coolant fluid conduits in said panel, each of said conduits including a coolant fluid inlet and a coolant fluid outlet and being isolated from fluid communication with one another;
a coolant fluid supply line in communication with each said inlet and a coolant fluid return line in communication with each said outlet; and
a plurality of pressure sensors for continuously transmitting pressure data signals to a monitoring unit, wherein at least one of said plurality of pressure sensors is in communication with said coolant fluid supply line and another of said plurality of pressure sensors is in communication with said coolant fluid return line.

4. A furnace panel leak detection system comprising:
a metallic panel;
at least one thermocouple received in said panel;
a plurality of coolant fluid conduits in said panel, each of said conduits including a coolant fluid inlet and a coolant fluid outlet and being isolated from fluid communication with one another;
a coolant fluid supply line in communication with each said inlet and a coolant fluid return line in communication with each said outlet; and
at least one plurality of: (1) temperature sensors for continuously transmitting temperature data signals to a monitoring unit, (2) pressure sensors for continuously transmitting pressure data signals to a monitoring unit, and (3) flow sensors for continuously transmitting flow data signals to a monitoring unit, wherein one of each of said plurality of temperature, pressure and flow sensors is in communication with said coolant fluid supply line and another of said plurality of temperature, pressure and flow sensors is in communication with said coolant fluid return line.

5. A method for detecting a coolant leak in a furnace panel without interrupting furnace operation, said method comprising:
(a) providing a fluid-cooled furnace panel comprising:
a metallic body; and
a plurality of coolant fluid conduits in said body, wherein each of said conduits is isolated from fluid communication with one another and possesses sufficient flow capacity to independently cool said body without interrupting furnace operation;

(b) closing one of said plurality of conduits to fluid flow;

(c) testing the closed one of said plurality of conduits for fluid leakage; and (d) opening the closed one of said plurality of conduits.

6. The method of claim 5 further comprising sequentially repeating steps (b), (c) and (d) for each of said plurality of conduits.

7. The method of claim 5 wherein said method is performed periodically.

8. The method of claim 5 wherein said method is performed automatically.

9. The method of claim 5 wherein step (c) comprises pressure testing the closed one of said plurality of conduits.

* * * * *